C. N. GOSS.
HORSE RAKE.

No. 78,801. Patented June 9, 1868.

UNITED STATES PATENT OFFICE.

C. N. GOSS, OF CLAREMONT, NEW HAMPSHIRE.

IMPROVEMENT IN HORSE-RAKES.

Specification forming part of Letters Patent No. 78,801, dated June 9, 1868.

*To all whom it may concern:*

Be it known that I, C. N. Goss, of Claremont, county of Sullivan, and State of New Hampshire, have invented certain new and useful Improvements in Horse-Rakes; and I do hereby declare the following to be a full, clear, and exact description of the same, reference being had to the accompanying drawings, making a part of this specification, in which—

Figure 1:
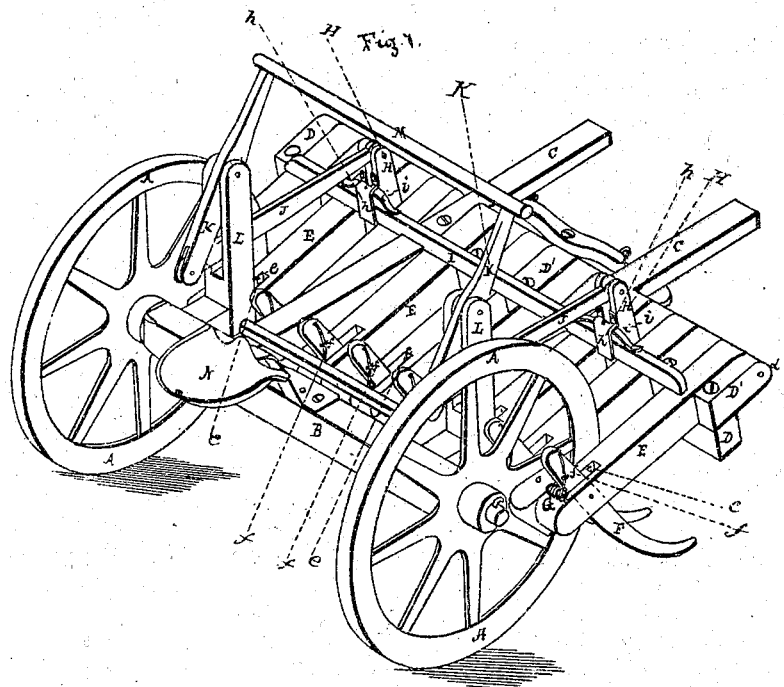
Figure 2:
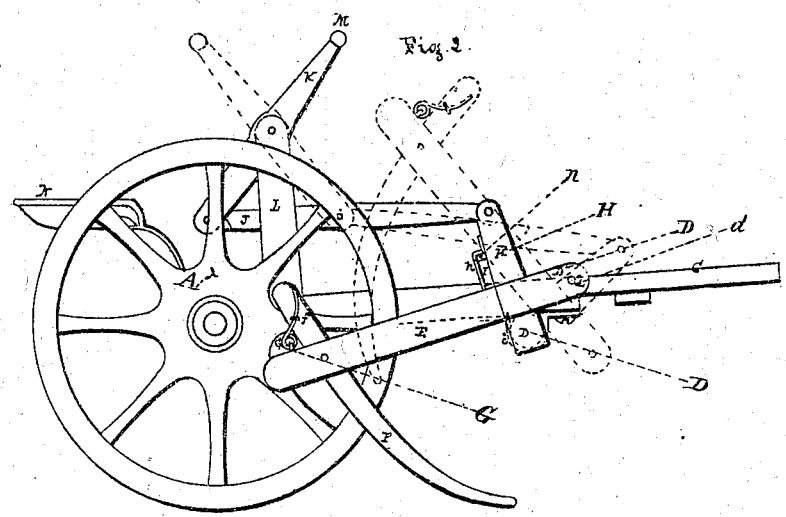

Figure 1 is a perspective view of a rake embracing my improvements, and Fig. 2 is a side elevation of the same.

Similar letters of reference denote corresponding parts in both figures.

My invention relates to that class of wheeled horse-rakes which employ wooden teeth; and it consists in a novel arrangement of the two pivots or centers upon which the tooth-bars turn relative to the shafts or thills, as hereinafter described.

It further consists in the employment of a yielding stop or pressure-bar so arranged relative to the rake-tooth points as to resist the independent movement of the tooth-bars without interfering with their vibration upon a common center for discharging their loads or for passing an obstruction.

It further consists in a novel arrangement of levers for operating the rake-tooth bars and rake-teeth, whereby the bars and teeth may be raised to discharge their load or held down to their work with the required pressure by the driver in his seat on the machine; and it further consists in a novel construction and arrangement of coil-spring relative to the pivoted rake-teeth and tooth-bars, as hereinafter described.

To enable others to understand and use my invention, I will proceed to describe the same with reference to the accompanying drawings, in which—

A A represent two carrying-wheels, mounted loosely on a common axle, B, to which the rear ends of the shafts or thills C C are connected by mortise or tenon, or in other suitable and substantial manner. At a convenient distance in advance of the axle a rock shaft or bar, D, is suspended in loops or bearings c, underneath the shafts C. Said bar is squared, except where it passes through the loops or bearings, and is provided on its upper face with a series of spaced arms or bars, D', projecting forward therefrom, between and in the forward ends of which the tooth-bars E are pivoted loosely and independently of each other, either upon a common pivot, $d$, extending through the series, or by a number of short independent pivots arranged in line with each other, as may be preferred. The bars E extend backward from the pivot $d$, resting upon the pivot bar or shaft D, to a point slightly forward of the main axle B, and are provided at their rear ends with vertical slots or mortises $e$, in which the wooden teeth F, made in form substantially as represented in the drawings, are pivoted, the slots or mortises being elongated to allow any desired amount of play or vibration of the teeth relative to the bars E. The upper or heel ends of the teeth F extend slightly above the tooth-bars, and are provided with staples $f$, through which the upper free end of a coil-spring, G, plays, the action or tension of the spring serving to draw the upper end of the teeth backward and to resist the action of the load or any backward strain upon the points thereof. The lower or opposite end of the spring or coil is fastened in the rear end of the tooth-bar, and is further secured thereto by means of a staple passing through the coil. The bar or rock-shaft D has two upright arms or levers, H, rigidly attached to it, provided with guide brackets or loops, $h$, in which is arranged a transverse stop or pressure bar, I, extending over the series of tooth-bars and the shaft C, in the manner represented in Fig. 1. Springs $i$, of any suitable form or construction, are employed to hold the bar I down upon the tooth-bars E. The teeth bars or arms are thus clamped between the pivot or rock shaft D and the yielding bar I in such manner that while the independent upward movement of the teeth upon pivot $d$ in meeting a slight obstacle is resisted by the yielding bar I with any desired force, said bar being connected through arms H to the shaft D, the operation of raising the teeth together and discharging their load or for passing an obstruction is not affected thereby. The degree of resistance of bar I to the independent movement of the teeth may be adjusted by means of a set-screw regulating the tension of the spring, or by the spring itself, which may be so made as to yield easily at first with a gradually-increasing resistance, until it shall be sufficient to receive the weight of all the teeth, causing it to turn or raise them upon the rock-shaft D. The upper ends of standards H are slotted to receive the forward ends of rod J, pivoted thereto, the rear ends of said bars being in turn pivoted to the lower ends of upright pivoted levers K, mounted in uprights L, rigidly connected with the axle B or shafts C in any suitable manner. The upper ends of levers K are united by a lever bar or handle, M, within convenient reach of the driver on seat N, as represented in the drawings. By this arrangement of levers the driver is enabled, by simply pressing forward on the bar or handle M or levers K, to hold the teeth down to their work with any required force, and when a sufficient load has been gathered thereby, by simply reversing the movement of the levers and drawing back the same, the shaft D is rolled forward in its bearings, and the tooth-bars resting thereon are raised to discharge their load in a manner that will be readily understood.

Having now described my improvements in horse-rakes, what I claim as new, and desire to secure by Letters Patent, is—

1. The arrangement of the two pivots or centers D d, upon which the tooth-bars turn in the described relation to each other and to the shafts or thills, for the purpose set forth.

2. The arrangement of the stop-bar I relative to the tooth-bar pivots D d, substantially as and for the purpose set forth.

3. The arrangement of the rock-shaft D, substantially as described, whereby it is made to constitute the rest or support of the independently-pivoted tooth-bars, as well as the common center upon which said tooth-bars are vibrated to discharge the gathered load.

4. The levers H and L, in combination with the pivoted tooth-bars and stop-bar I, substantially as described, whereby the driver is enabled to hold the teeth down to their work and to raise the same for discharging the load or for passing an obstruction, as set forth.

5. The coil-spring G, applied to and operating in combination with the rake-bars and pivoted rake-teeth, substantially as and for the purpose set forth.

In testimony whereof witness my hand this 13th day of April, 1868.

C. N. GOSS.

Witnesses:
I. R. COOPER,
JNO. L. FARWELL.